US006874055B2

(12) United States Patent
Chiang et al.

(10) Patent No.: US 6,874,055 B2
(45) Date of Patent: Mar. 29, 2005

(54) USB CONTROL CIRCUIT WITH AUTOMATIC ROUTE-SWITCHING FUNCTION

(75) Inventors: Chin-Yi Chiang, Taipei (TW); Ching-Chung Lai, Taipei (TW)

(73) Assignee: Via Technologies, Inc., Taipei (TW)

( * ) Notice: Subject to any disclaimer, the term of this patent is extended or adjusted under 35 U.S.C. 154(b) by 408 days.

(21) Appl. No.: 10/098,597

(22) Filed: Mar. 18, 2002

(65) Prior Publication Data

US 2003/0110342 A1 Jun. 12, 2003

Related U.S. Application Data

(60) Provisional application No. 60/330,565, filed on Oct. 25, 2001.

(30) Foreign Application Priority Data

Dec. 10, 2001 (TW) ........................ 90130456 A

(51) Int. Cl.$^7$ ............................................ G06F 13/00
(52) U.S. Cl. ...................................................... 710/316
(58) Field of Search ........................................ 710/316

(56) References Cited

U.S. PATENT DOCUMENTS 6,199,137 B1 * 3/2001 Aguilar et al. .............. 710/305
6,256,700 B1 * 7/2001 Sauber ........................ 710/316
6,732,219 B1 * 5/2004 Broyles ...................... 710/316

OTHER PUBLICATIONS

EHCI Specification, Revision 0.96; Intel Corporation, Jun. 20, 2001; pp. 54–59.*

* cited by examiner

Primary Examiner—Glenn A. Auve
Assistant Examiner—Nimesh Patel
(74) Attorney, Agent, or Firm—Rosenberg, Klein & Lee

(57) ABSTRACT

The present invention discloses a universal serial bus (USB) control circuit, and more particularly, a USB control circuit with an automatic route-switching function. The USB control circuit comprises: a plurality of USB pads, connecting a plurality of USB devices; a plurality of USB transceivers, each connected to a corresponding USB pad; at least one USB controller, each connected to at least one corresponding USB transceivers, so as to control and drive the USB devices connected to the corresponding USB pads by using the corresponding USB transceivers; a plurality of port routing controllers, each connected to a corresponding USB transceiver; at least one enhanced USB transceivers, each connected to each of the USB pads and each of the port routing controllers; an enhanced USB controller, connected to each of the enhanced USB transceivers, so as to control and drive the enhanced USB devices connected to the corresponding USB pads by using the corresponding enhanced USB transceivers; and an enhanced device routing controller, connected to each of the port routing controllers, so as to automatically switch a USB pad that connects enhanced USB devices to the enhanced USB transceivers to be controlled by the enhanced USB controller.

13 Claims, 4 Drawing Sheets

USB CONTROL CIRCUIT WITH AUTOMATIC ROUTE-SWITCHING FUNCTION

RELATED PATENT APPLICATIONS

This patent application is based upon Provisional Patent Application, Ser. No. 60/330,565, filed at the U.S. Patent and Trademark Office on 25 Oct. 2001.

BACKGROUND OF THE INVENTION

1. Field of the Invention

The present invention generally relates to a universal serial bus (to be abbreviated as USB hereinafter) control circuit, and more particularly, to a USB control circuit with an automatic route-switching function. The USB control circuit employs an enhanced device routing controller to operate in coordination with a plurality of port routing controllers and switching devices such that the port connected with enhanced USB devices is automatically switched to the enhanced USB transceivers to be controlled by the enhanced USB host controller.

2. Description of the Prior Art

With the rapid development in the information industry, people have increasing needs for a higher operation speed as well as a higher data transmission rate of information products. Universal Serial Bus (USB) technology according to the conventional USB standard (USB 1.1) has become insufficient in many aspects.

The advantages of the USB standard include compatibility with "Plug-And-Play" (PNP), ability in connecting up to 127 different peripheral devices on the bus at a time and only one interruption request (IRQ) is required. The conventional USB standard 1.1 has been applied in variety of computer peripheral application designs, but no one has heretofore thought to use it as an interface for an image processing system. This is primarily because the conventional USB standard is much slower than the PCI or ISA buses. More particularly, the theoretical maximum bandwidth of the USB standard is 12 mega bits per second (Mbps) or 1.5 mega bytes per second (MBps), several times slower than the 8.33 MBps ISA bus and orders of magnitude slower than the 133 MBps PCI bus. And in real applications, there may has more than one device share the same USB interface, no single peripheral can expect to utilize the full range of the 1.5 MBps maximum theoretical bandwidth of the USB standard. Accordingly, USB 1.1 is not believed to be fast enough to support the data flow requirements of an image processing system.

Even though a new USB standard (USB 2.0) has recently been proposed to reach a higher data transmission rate of 480 Mbps, however, most of the peripheral devices still operate according to USB 1.1. A solution to solve the compliance problem between USB 1.1 and USB 2.0 with four USB ports is illustrated in FIG. 1. The configuration comprises: a first USB pad 121, connected to a first USB port 141; a second USB pad 123, connected to a second USB port 143; a third USB pad 125, connected to a third USB port 145; a fourth USB pad 127, connected to a fourth USB port 147; an enhanced USB host controller 13, a first USB host controller 15 and a second USB host controller 17; wherein there are an enhanced USB transceiver 16, a USB transceiver 18 and a port routing controller 19 installed in each of the USB ports 141, 143, 145 and 147.

Since the enhanced USB transceiver 16 and the USB transceiver 18 are connected to each of the USB pads 121, 123, 125 and 127, and each of the enhanced USB transceiver 16 and the USB transceiver 18 is connected to the enhanced USB host controller 13 or one of the first USB host controller 15 and the second USB host controller 17 by the port routing controller 19. In this fashion, whether the USB device (not shown) connected to a USB pad is an enhanced USB device or not can be determined by an enhanced USB device chirp sequence. Furthermore, the control over the USB pad is switched to the USB host controller or the enhanced USB host controller by the port routing controller 19, so as to achieve a higher transmission rate.

In the universal host controller interface (UHCI) specification according to USB 1.1, one host controller can only control two USB ports. Even though there is no such limit in another specification, the open host controller interface (OHCI), however, in practical cases, only three USB ports can be controlled. This results in two USB host controllers. On the other hand, an enhanced USB host controller can control a plurality of USB ports.

The prior art configuration may achieve automatic port route switching to prevent improper interconnection. However, one enhanced USB transceiver is required for each pad. Moreover, the occupied area ratio of an enhanced USB transceiver to a USB transceiver is about 10:1. The chip size of a generally utilized configuration with 6 USB ports may dramatically increase due to the enhanced USB transceiver is applied at every USB pads, and this will result in increasing fabrication cost. Furthermore, the above configuration may lead to a considerable waste of resources since there is little chance for all the USB pads to be connected with enhanced USB devices.

Accordingly, to avoid any possible waste of resources, the number of enhanced USB transceivers is designed to be less than the number of USB pads. This will limit the enhanced USB devices to be connected to some specific USB pads. Therefore, if it is not confirmed whether each of the USB pads is connected to an enhanced USB transceivers such that some enhanced USB devices are connected to the pads that are not connected to the enhanced USB transceivers, and the enhanced USB devices will not function as they are designed to.

Certainly, the enhanced USB devices is not only meaning the high speed USB devices, but also further over high speed USB devices.

Therefore, there is need in providing a USB control circuit with an automatic route-switching function, so as to overcome the problems such as waste of resources, improper interconnection and increased fabrication cost.

SUMMARY OF THE INVENTION

Accordingly, it is the primary object of the present invention to provide a USB control circuit with an automatic route-switching function, employing an enhanced device routing controller to automatically switch a USB pad that connects with enhanced USB devices to the enhanced USB transceivers to be controlled by the enhanced USB host controller.

It is another object of the present invention to provide a USB control circuit with an automatic route-switching function, where the number of enhanced USB transceivers is less than the number of USB pads so that the chip area is reduced and the fabrication cost is lowered.

It is still another object of the present invention to provide a USB control circuit with an automatic route-switching function, where each of the USB pads is connected to an enhanced USB transceiver by a switching device and the route is automatically switched by an integrated routing controller.

It is still another object of the present invention to provide a USB control circuit with an automatic route-switching function, where the switching device comprises a plurality of control switches whose ON/OFF states are controlled by the enhanced device routing controller or the integrated routing controller to switch the route.

In order to achieve the foregoing objects, the present invention provides a USB control circuit with an automatic route-switching function, comprising: a plurality of USB pads, connecting a plurality of USB devices; a plurality of USB transceivers, each connected to a corresponding USB pad; at least one USB host controller, each connected to at least one corresponding USB transceivers, so as to control and drive the USB devices connected to the corresponding USB pads by using the corresponding USB transceivers; a plurality of port routing controllers, each connected to a corresponding USB transceiver; at least one enhanced USB transceivers, each connected to each of the USB pads and each of the port routing controllers; an enhanced USB host controller, connected to each of the enhanced USB transceivers, so as to control and drive the enhanced USB devices connected to the corresponding USB pads by using the corresponding enhanced USB transceivers; and an enhanced device routing controller, connected to each of the port routing controllers, so as to automatically switch a USB pad that connects enhanced USB devices to the enhanced USB transceivers to be controlled by the enhanced USB host controller.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention providing a USB control circuit with an automatic route-switching function can be exemplified by the preferred embodiments as described hereinafter.

Figure 1:
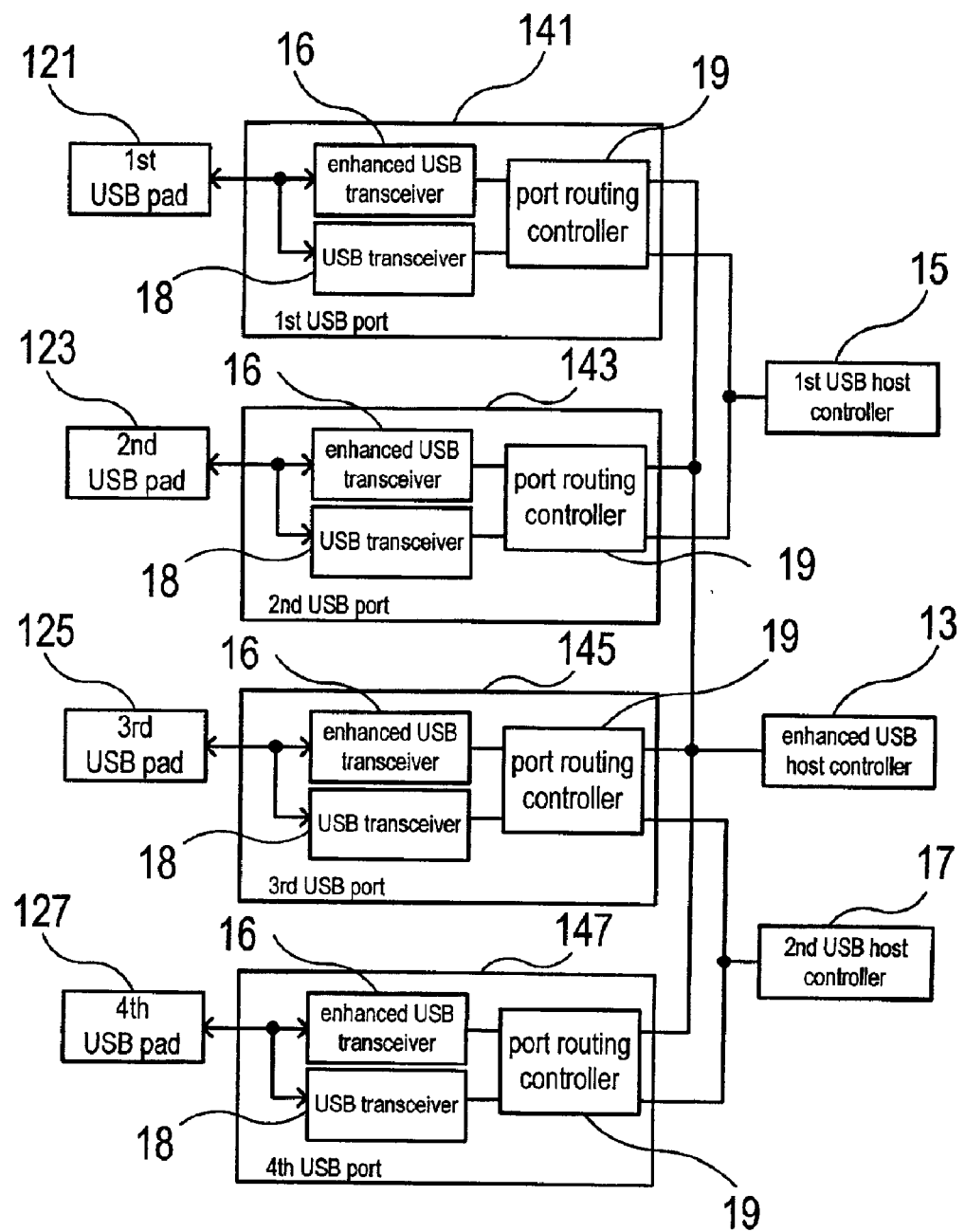
FIG. 1 is a circuit diagram showing the USB control circuit in accordance with the prior art.
Figure 2:
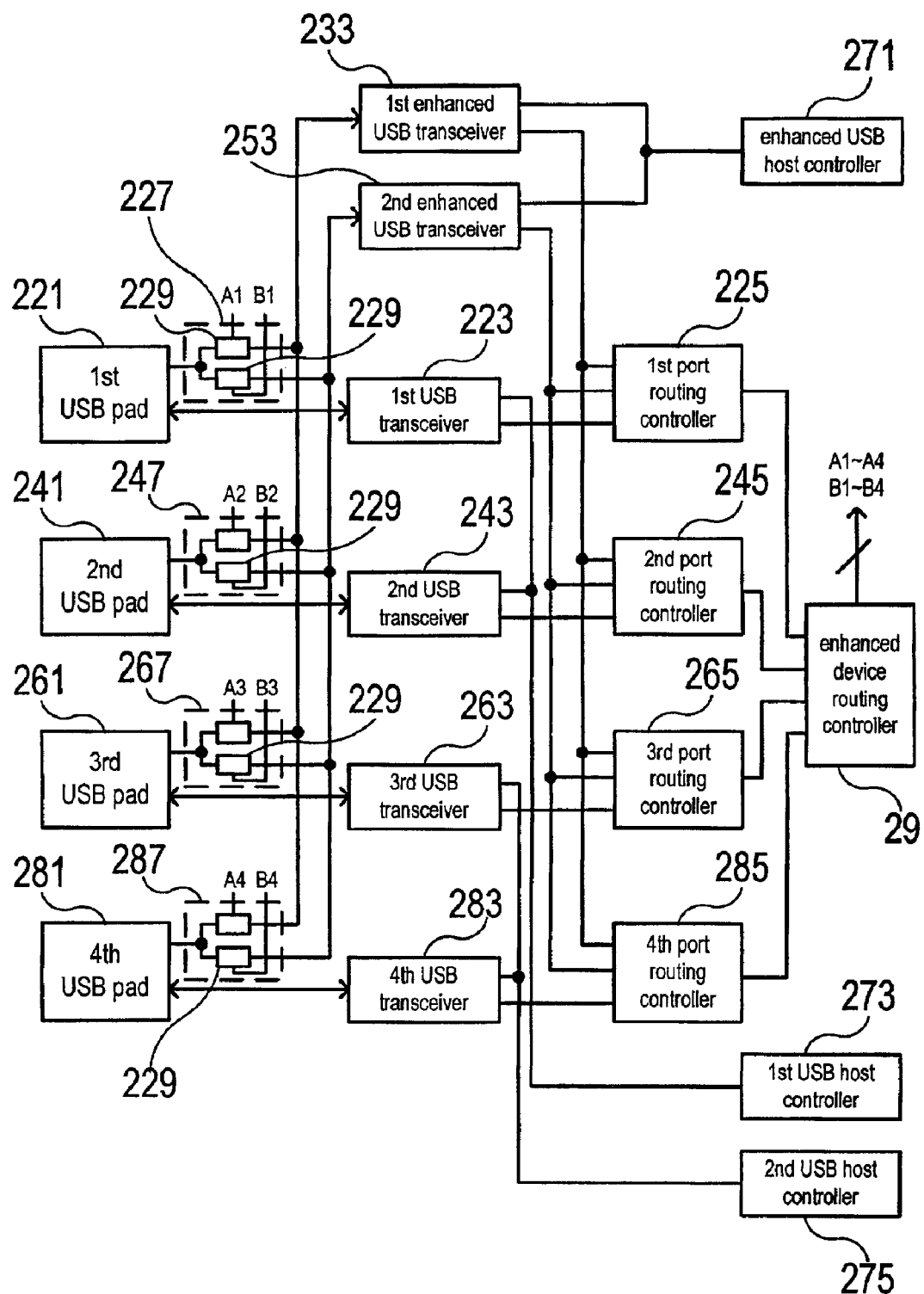
FIG. 2 is a circuit diagram showing the USB control circuit in accordance with one embodiment of the present invention.

To start with, please refer to FIG. 2, which is a circuit diagram showing the USB control circuit in accordance with one embodiment of the present invention. In the present embodiment, 4 USB peripheral devices are allowed. The configuration comprises: a first USB pad 221, connected to a first switching device 227 and a first USB transceiver 223, wherein the first USB transceiver 223 is further connected to a first port routing controller 225 and a first USB host controller 273; a second USB pad 241, connected to a second switching device 247 and a second USB transceiver 243, wherein the second USB transceiver 243 is further connected to a second port routing controller 245 and the first USB host controller 273; a third USB pad 261, connected to a third switching device 267 and a third USB transceiver 263, wherein the third USB transceiver 263 is further connected to a third port routing controller 265 and a second USB host controller 275; a fourth USB pad 281, connected to a fourth switching device 287 and a fourth USB transceiver 283, wherein the fourth USB transceiver 283 is further connected to a fourth port routing controller 285 and the second USB host controller 275; a first enhanced USB transceiver 233 and a second enhanced USB transceiver 253, each connected to each of the USB pads through the corresponding switching devices and connected to each of the port routing controllers and an enhanced USB host controller 271; and an enhanced device routing controller 29, connected to each of the port routing controllers, so as to automatically switch a USB pad that connects enhanced USB devices to the enhanced USB transceivers to be controlled by the enhanced USB host controller.

In the above configuration, when any USB pad, such as the third USB pad 261, is connected to a USB device, the third USB transceiver 263 together with the third port routing controller 265 will determine weather the USB device is a low speed USB device. If the USB device is a low speed USB device, the third port routing controller 265 will set the route to be connected to the third USB transceiver 263 to be controlled by the second USB host controller 275. If the USB device is not a low speed USB device, the third port routing controller 265 will first stop the connection of the third USB transceiver 263 and then the enhanced device routing controller 29 will enable the third switching device 267 to switch the route to an unoccupied enhanced USB transceiver, such as the second enhanced USB transceiver 253, according to the operation of each of the enhanced USB transceivers. Later, the second enhanced USB transceiver 253 will perform an enhanced USB device chirp sequence so as to determine weather the USB device is an enhanced USB device. If the USB device is an enhanced USB device, the USB device will keep connected with the second enhanced USB transceiver 253 to be controlled by the enhanced USB host controller 271. However, if the USB device is not an enhanced USB device, the route will be switched to the third USB transceiver 263 to be controlled by the second USB host controller 275.

Moreover, the switching devices can comprise at least one control switch 229, each connected to the corresponding USB pad, port routing controller and the other enhanced USB transceiver 253. Each of the control switches 229 controls the port route and is controlled by the enhanced device routing controller 29. Enhance device routing controller 29 will set the control switch to ON state or OFF state to switch the route. Besides, each of the port routing controllers has a port status register, which is compatible with the port status register functions in the prior art; therefore, the status of each USB port can be monitored directly by software driver without any software modification.

Figure 3:
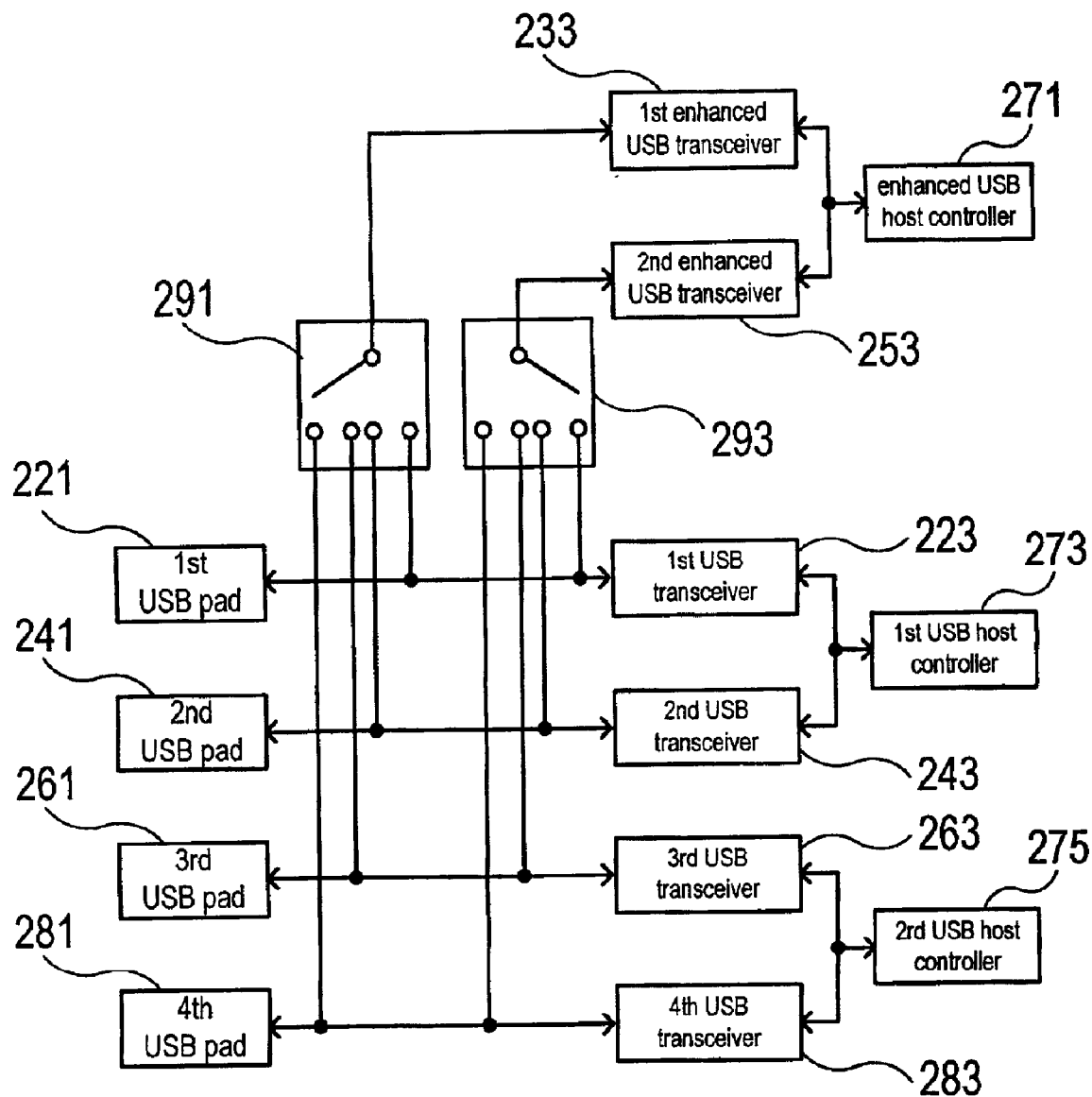
FIG. 3 is a circuit diagram showing the operation of the USB control circuit in accordance with one embodiment of the present invention.

Furthermore, please refer to FIG. 3, which is a circuit diagram showing the operation of the USB control circuit in accordance with one embodiment of the present invention.

As shown in the drawing, each of the enhanced USB transceivers 233 and 253 has a switch 291/293. The first enhanced USB transceiver 233 is connected to each of the USB pads via the first switch 291, while the second enhanced USB transceiver 253 is connected to each of the USB pads via the second switch 293. When a USB device is connected to one of the USB pads, the corresponding USB transceiver determines weather the USB device is a low speed USB device. If the USB device is a low speed USB device, the route will be connected to the USB transceiver to be controlled by the corresponding USB host controller. If the USB device is not a low speed USB device, an unoccupied enhanced USB transceiver will perform an enhanced USB device chirp sequence so as to determine weather the USB device is an enhanced USB device. If the USB device is an enhanced USB device, the USB device will keep connected with the enhanced USB transceiver to be controlled by the enhanced USB host controller 271. However, if the USB device is not an enhanced USB device, the route will be switched to the corresponding USB transceiver to be controlled by the corresponding USB host controller.

Figure 4:
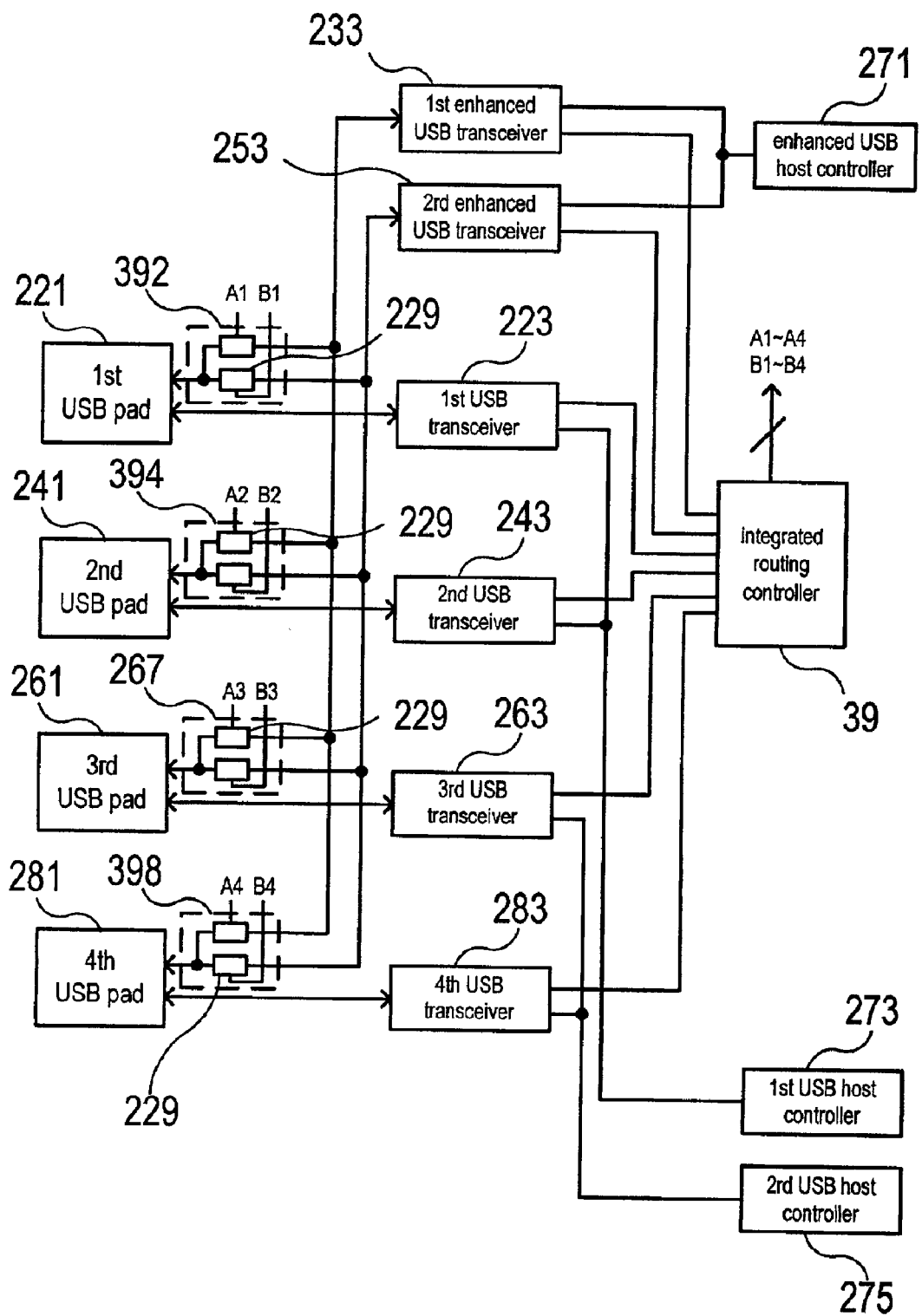
FIG. 4 is a circuit diagram showing the USB control circuit in accordance with another embodiment of the present invention.

At last, please refer to FIG. 4, which is a circuit diagram showing the USB control circuit in accordance with another embodiment of the present invention. In the present embodiment, the configuration comprises: a first USB pad 221, connected to a first switching device 392 and a first USB transceiver 223, wherein the first switching device 392 determines weather the first USB pad 221 is further connected to a first enhanced USB transceiver 233 or a second enhanced USB transceiver 253; a second USB pad 241, connected to a second switching device 394 and a second USB transceiver 243, wherein the second switching device 394 determines weather the second USB pad 241 is further connected to the first enhanced USB transceiver 233 or the second enhanced USB transceiver 253; a third USB pad 261, connected to a third switching device 396 and a third USB transceiver 263, wherein the third switching device 396 determines weather the third USB pad 261 is further connected to the first enhanced USB transceiver 233 or the second enhanced USB transceiver 253; a fourth USB pad 281, connected to a fourth switching device 398 and a fourth USB transceiver 283, wherein the fourth switching device 398 determines weather the fourth USB pad 281 is further connected to the first enhanced USB transceiver 233 or the second enhanced USB transceiver 253; wherein the first enhanced USB transceiver 233 and the second enhanced USB transceiver 253 are connected to an enhanced USB host controller 271, the first USB transceiver 223 and the second USB transceiver 243 are connected to a first USB host controller 273, and the third USB transceiver 263 and the fourth USB transceiver 283 are connected to a second USB host controller 275. The configuration further comprises: an integrated routing controller 39, connected to each of the transceivers and the switching devices, so as to automatically switch the USB pad that connects enhanced USB devices to the enhanced USB transceivers to be controlled by the enhanced USB host controller.

The embodiment as described in FIG. 4 is similar to the embodiment as described in FIG. 2. Each of the switching devices is connected to the USB transceivers to switch the route to an unoccupied enhanced USB transceiver by the integrated routing controller 39 according to the operation of each of the enhanced USB transceivers so as to perform an enhanced USB device chirp sequence after the USB device is determined as a high speed or full speed USB device. Later, whether the route is switched to the enhanced USB transceiver to be controlled by the enhanced USB host controller 271 or the route is switched to the USB transceiver to be controlled by the USB host controller 273/275 is determined according to the result of the chirp sequence.

In the embodiment as described in FIG. 4, the switching devices can comprise a plurality of control switches 229, each connected to the corresponding USB pad and the second enhanced USB transceiver 253. Each of the control switches 229 controls the port route and is controlled by the integrated routing controller 39 to be ON or OFF such that the route is switched. The integrated routing controller 39 has a plurality of status registers; therefore, the status of each USB port can be monitored directly by software driver without any software modification.

The embodiment as described in FIG. 2 is constructed on a conventional structure, where the conventional port routing controller is accompanied by an enhanced device routing controller, so as to the objects of the present invention. On the other hand, the embodiment as described in FIG. 4 gets rid of the conventional port routing controller. Instead, an integrated routing controller is employed to control the switching of the route. Furthermore, the USB control circuit according to the present invention can be integrated in a south bridge chip, and this control architecture may also be applied in USB hub controller design.

Furthermore, if all the enhanced USB transceivers are already occupied, the USB device, enhanced or not, can only operate under the control of the USB transceiver. However, a larger number of enhanced USB transceivers can be employed when the number of enhanced USB devices is increased. Therefore, the embodiments of the present invention are really useful in reducing the fabrication cost and preventing improper device connection. In addition, the control circuit of the present invention can be compatible with existing software driver, thus the USB device manufacturers do not need to modify the driving programs because of the circuit designing.

According to the above discussion, it is apparent that the present invention discloses a USB control circuit with an automatic route-switching function, employing an enhanced device routing controller to automatically switch a USB pad that connects enhanced USB devices to enhanced USB transceivers to be controlled by the enhanced USB host controller. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A USB control circuit with an automatic route-switching function, comprising:
    a plurality of USB pads, connecting a plurality of USB devices;
    a plurality of USB transceivers, each connected to one corresponding USB pad;
    at least one USB host/hub controller, each connected to at least one corresponding USB transceivers, so as to control and drive said USB devices connected to said corresponding USB pads by said corresponding USB transceivers;
    a plurality of port routing controllers, each connected to one corresponding USB transceiver;

at least one enhanced USB transceiver, each connected to each of said USB pads and each of said port routing controllers;

an enhanced USB host/hub controller, connected to each of said enhanced USB transceivers, so as to control and drive at least one enhanced USB device connected to said corresponding USB pads by using said corresponding enhanced USB transceivers; and an enhanced device routing controller, connected to each of said port routing controllers, so as to automatically switch USB pads that connect enhanced USB devices to said enhanced USB transceivers to be controlled by said enhanced USB host/hub controller;

wherein there is a switching device disposed between said enhanced USB transceivers and each of said USB pads.

2. The USB control circuit as recited in claim 1, wherein said switching device is controlled by said enhanced device routing controller to be one of the ON and OFF states of being connected to said enhanced USB transceivers.

3. The USB control circuit as recited in claim 1, wherein said switching device comprises at least one control switch connected to said corresponding enhanced USB transceivers.

4. The USB control circuit as recited in claim 3, wherein each of said control switches is connected to said enhanced device routing controller that controls the ON/OFF states of said switch.

5. The USB control circuit as recited in claim 1, wherein each of said port routing controllers comprises a port status register.

6. The USB control circuit as recited in claim 1, wherein said control circuit can be integrated in one of a south bridge chipset and an USB hub controller design.

7. A USB control circuit with an automatic route-switching function, comprising:

a plurality of USB pads, connecting a plurality of USB devices;

a plurality of USB transceivers, each connected to one corresponding USB pad;

at least one USB host/hub controller, each connected to at least one corresponding USB transceivers, so as to control and drive said USB devices connected to said corresponding USB pads by said corresponding USB transceivers;

a plurality of port routing controllers, each connected to one corresponding USB transceiver;

at least one enhanced USB transceiver, each connected to each of said USB pads and each of said port routing controllers;

an enhanced USB host/hub controller, connected to each of said enhanced USB transceivers, so as to control and drive at least one enhanced USB device connected to said corresponding USB pads by using said corresponding enhanced USB transceivers; and an enhanced device routing controller, connected to each of said port routing controllers, so as to automatically switch USB pads that connect enhanced USB devices to said enhanced USB transceivers to be controlled by said enhanced USB host/hub controller;

wherein the number of enhanced USB transceivers is less than the number of USB pads.

8. A USB control circuit with an automatic route-switching function, comprising:

a plurality of USB pads, connecting a plurality of USB devices;

a plurality of switching devices, each connected to one corresponding USB pad;

a plurality of USB transceivers, each connected to one corresponding USB pad;

at least one USB host/hub controller, each connected to at least one corresponding USB transceivers, so as to control and drive said USB devices connected to said corresponding USB pads by using said corresponding USB transceivers;

at least one enhanced USB transceiver, each connected to each of said switching devices;

an enhanced USB host/hub controller, connected to each of said enhanced USB transceivers, so as to control and drive at least one enhanced USB device connected to said corresponding USB pads by using said corresponding enhanced USB transceivers; and an integrated routing controller, connected to each of said USB transceivers and each of said enhanced USB transceivers, so as to automatically switch USB pads that connect enhanced USB devices to said enhanced USB transceivers to be controlled by said enhanced USB host/hub controller;

wherein each said switching device is controlled by said integrated routing controller to be one of the ON and OFF states of being connected to said enhanced USB transceivers.

9. The USB control circuit as recited in claim 8, wherein said switching device comprises at least one control switch connected to said corresponding enhanced USB transceiver.

10. The USB control circuit as recited in claim 9, wherein each of said control switches is connected to said integrated routing controller that controls the ON/OFF states of said switch.

11. The USB control circuit as recited in claim 8, wherein said integrated routing controller comprises a plurality of port status registers.

12. The USB control circuit as recited in claim 8, wherein said control circuit can be integrated in one of a south bridge chipset and an USB hub controller design.

13. A USB control circuit with an automatic route-switching function, comprising:

a plurality of USB pads, connecting a plurality of USB devices;

a plurality of USB transceivers, each connected to one corresponding USB pad;

at least one USB host/hub controller, each connected to at least one corresponding USB transceivers, so as to control and drive said USB devices connected to said corresponding USB pads by using said corresponding USB transceivers;

at least one enhanced USB transceiver, each connected to each of said USB pads via a corresponding one of a plurality of switching devices; and an enhanced USB host/hub controller, connected to each of said enhanced USB transceivers, so as to control and drive at least one enhanced USB device connected to said corresponding USB pads by using said corresponding enhanced USB transceivers;

wherein there is a switching device disposed between said enhanced USB transceivers and each of said USB pads.

* * * * *